(12) United States Patent
Wishneusky

(10) Patent No.: US 7,415,027 B2
(45) Date of Patent: Aug. 19, 2008

(54) PROCESSING FRAME BITS

(75) Inventor: John A. Wishneusky, Fitzwilliam, NH (US)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 10/404,287

(22) Filed: Mar. 31, 2003

(65) Prior Publication Data

US 2004/0190509 A1   Sep. 30, 2004

(51) Int. Cl.
*H04L 12/56* (2006.01)
(52) U.S. Cl. .................... 370/395.31; 370/255
(58) Field of Classification Search ........... 370/389, 370/392, 363, 368, 371, 374, 378, 379, 381, 370/382, 395.31, 395.32
See application file for complete search history.

(56) References Cited

U.S. PATENT DOCUMENTS 5,465,345 A    11/1995   Blanc et al.

7,050,394 B2 *  5/2006   Johnson et al. .......... 370/230.1

OTHER PUBLICATIONS

Intel, Intel IXP425 Network Processor Family Technical Overview, Aug. 2002, pp. 1-20.
Intel, CD2481, Programmable Four-Channel Communication Controller, May 2001, pp. 1-221.
Intel, Intel IXP1200 Network Processor Family, Hardware Reference Manual, Aug. 2001, pp. 1-272.

* cited by examiner

*Primary Examiner*—Brenda Pham
(74) *Attorney, Agent, or Firm*—Molly A. McCall

(57) ABSTRACT

In general, in one aspect, the disclosure describes a method of processing bits of a frame. The method includes accessing a subset of bits of a frame and based, at least in part, on the subset of bits, determining an address of an instruction within a set of instructions that perform at least one framing operation on the bits. The method executes instructions at the determined instruction address.

25 Claims, 6 Drawing Sheets

EntryN#:
    // new nibble is 1100, prior one's count was 4
    // Flag recognized
    new_residue = '0'
    residue_bits = residue_bits + 3  ← 148
    new_one_count=0
    branch to Flag_recognized#

Character_processing#:  ← 150
    If residue-bits >= 8
        Process new character to buffer
        Remove character bits from residue
        residue_bits = residue_bits - 8
    Branch loop#

...

End_Flag_recognized#  ← 152
    If residue_bits != 8
        Set residual character error
    Else
        Check CRC
    Complete frame status Branch loop#

FIG. 3B

PROCESSING FRAME BITS

BACKGROUND

A wide variety of mediums carry data between computing devices. For example, a computer can communicate with other network devices through wire, optic, or wireless mediums. These mediums carry signals representing the 1-s and 0-s used in digital systems. For example, a particular voltage in a copper wire may identify a "1" while another voltage identifies a "0".

Unfortunately, communication errors sometime occur, for example, due to noise or other problems. To reduce the potential impact of communication errors, many network devices communicate using logical groupings of bits known as frames. Typically, in addition to a payload of data, a frame often includes data that enables a receiver to detect and, potentially, correct transmission errors. The frame may also include other information such as the description of the payload (e.g., Internet Protocol packets).

Many protocols reserve special sequences of bits, known as flags, to encode information. For example, some protocols define flags that identify the start and end of a frame. For instance, a protocol known as High-Level Data Link Control (HDLC) reserves the bit sequence "01111110" (six "1"-s sandwiched by "0"-s) to identify the start and end of a frame. Thus, an HDLC frame is structured as:

[01111110]—frame data—[01111110].

An HDLC receiver can, therefore, identify the start and end of a frame by detecting the sequence of bits reserved for the start and end flags. Potentially, however, some sequence of bits within the frame may coincidentally happen to be the same as a sequence of bits in a flag. To prevent misinterpretation of frame data as a flag, HDLC uses a technique known as bit-stuffing. To perform bit stuffing in HDLC, a sender inserts a "0" whenever five consecutive "1"-s are encountered. For example, frame data of

" . . . 0011111101 . . . "

would be transmitted as

" . . . 00111110101 . . . "

where the underlined "0" represents a stuffed bit. To recover the intended frame contents, a receiver strips a "0" following five consecutive "1"-s. Framing protocols also define other flags such as an abort flag (e.g., seven or more consecutive "1"-s) that indicates aborted transmission of a frame.

BRIEF DESCRIPTION OF THE DRAWINGS

FIGS. 3A and 3B are a listing of instructions that perform frame operations.

DETAILED DESCRIPTION

Figure 1:
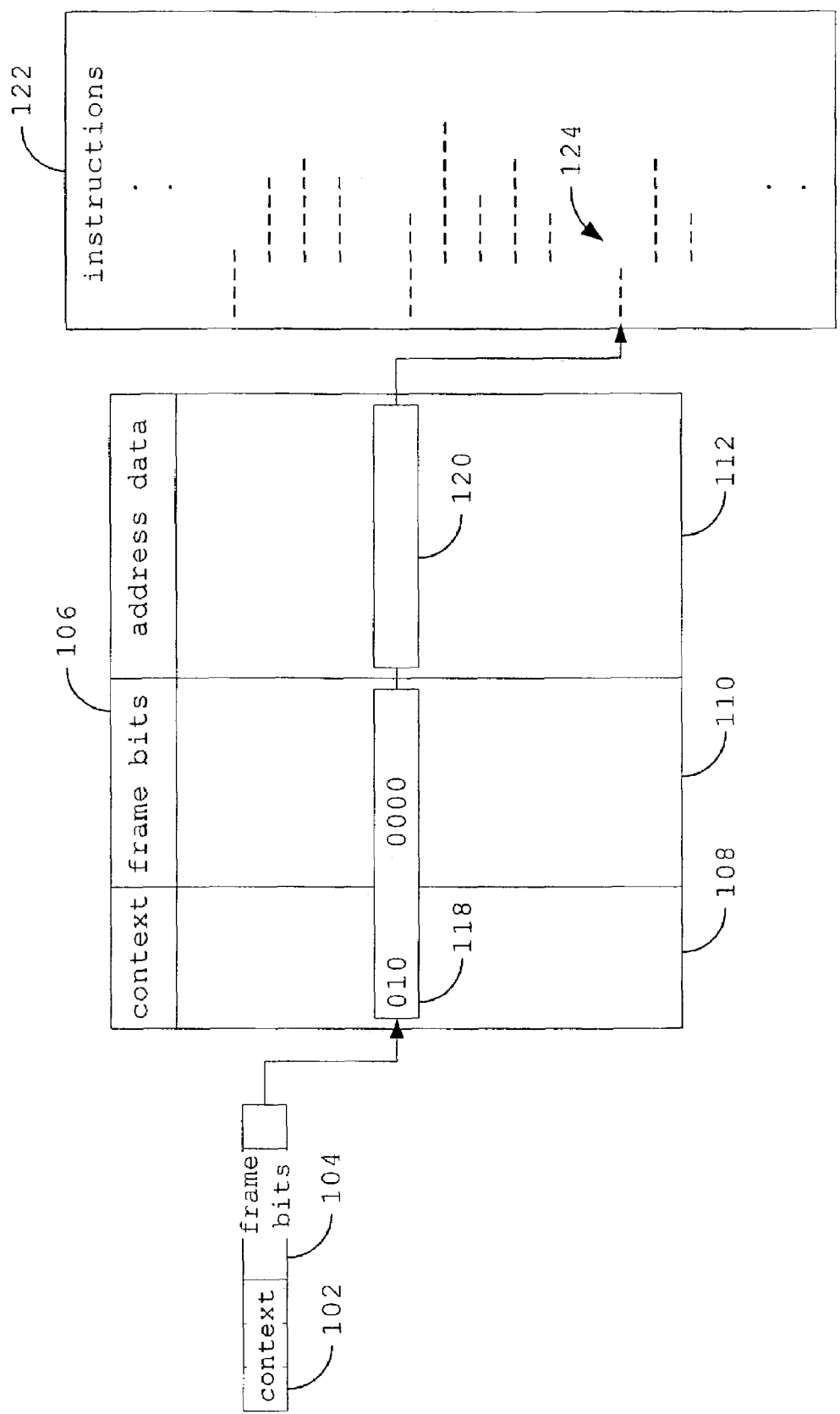
FIGS. 1 and 2 are diagrams illustrating determination of instruction address data based, at least in part, on bits of a frame.

FIG. 1 depicts a scheme that performs frame processing operations on frame bits. Such operations can include bit-stuffing, bit-stripping, flag recognition, and so forth. As shown, these operations are performed by the execution of frame processing instructions 122. Different sets of the instructions 122 handle different bit sequence scenarios. To quickly advance execution to the appropriate set of instructions, the illustrated scheme determines the address of a set of instructions based, at least in part, on a set of frame bits being processed. The ability to quickly jump to the appropriate instructions can substantially reduce the number of conditional statements evaluated during run-time. This, in turn, can result in faster frame processing and reduce the memory used to store the frame processing instructions 122. Additionally, operating on multiple frame bits at the same time can, potentially, save processing cycles as compared to a system that serially processes each individual frame bit.

The determination of which instructions to execute for a given set of frame bits may be performed in a wide variety of ways. For example, as shown in FIG. 1, a sample implementation performs a table 106 lookup keyed 108, 110 by a set of frame bits being processed 104 and the context 102 of the bits within the frame bit-stream. The lookup yields address data 120 that indicates where instruction execution should begin 124. The address data 112 may completely specify an instruction address or may, alternately, specify an offset from a base address.

As an example, for bits in a High-Level Data Link Control (HDLC) frame, the set of instructions executed can depend on a set of frame bits being processed 104 and a count of consecutive "1"-s immediately preceding the current set of bits. For instance, if a nibble (4-bits) of frame bits being processed was "0000" and the "1"-s count was "5", the first "0" in the nibble would represent a stuffed "0". Thus, a table 106 lookup keyed by this nibble and "1"-s count would yield the address of an instruction sequence that strips the lead "0" of the nibble. However, If the "1"-s count was less than "5", the table 106 lookup would yield address data for instructions that retain the lead "0". Again, the instructions can perform a variety of framing operations besides bit stuffing and stripping such as determining a new "1"-s count and/or frame state, identifying frame characters (e.g., start, end, and abort flags), computing a checksum or Cyclic Redundancy Code (CRC) for a frame, and so forth.

The use of a table 106 that identifies different instruction address 112 execution points can potentially offer a variety benefits. For example, such a technique can map many different keys to the same set of instructions. For example, a nibble of frame bits of "0000" can be processed by same set of instructions whether the 1-s count is 0, 1, 2, 3, or 4. Thus, the table 106 can store the same instruction address data 112 for these different keys. This can reduce unnecessary code duplication and reduce the footprint of the instructions 122. Additionally, by using a table 106, the instructions handling different scenarios can be of differing, arbitrary lengths.

Alternate implementations may feature different lookup tables and may be accessed using differently constructed keys. For example, instead of being keyed by a combination of context 102 and frame bits 106, the lookup may be keyed by the set of frame bits 106 alone. Additionally, some implementations may determine an instruction address without use of a lookup table. For example, a system can determine an address by logical manipulation of a set of frame bits and/or context. For instance, a system can shift frame bits being processed by n places. For instance, a frame nibble of "0100" left-shifted three places would yield an address (or address offset) of "010000".

Potentially, depending on the information used in determining the instruction address, the execution instructions may process the frame bits with a reduced number of test and branch decisions. This can save execution cycles. For example, in a scheme that uses a set of frame bits and a "1"-s count to determine the address of a set of instructions, the instructions jumped to "know", by virtue of their being selected for execution, if and where a flag or abort character terminates within the current set of bits, which bits to output or strip, and so forth.

Figure 2:
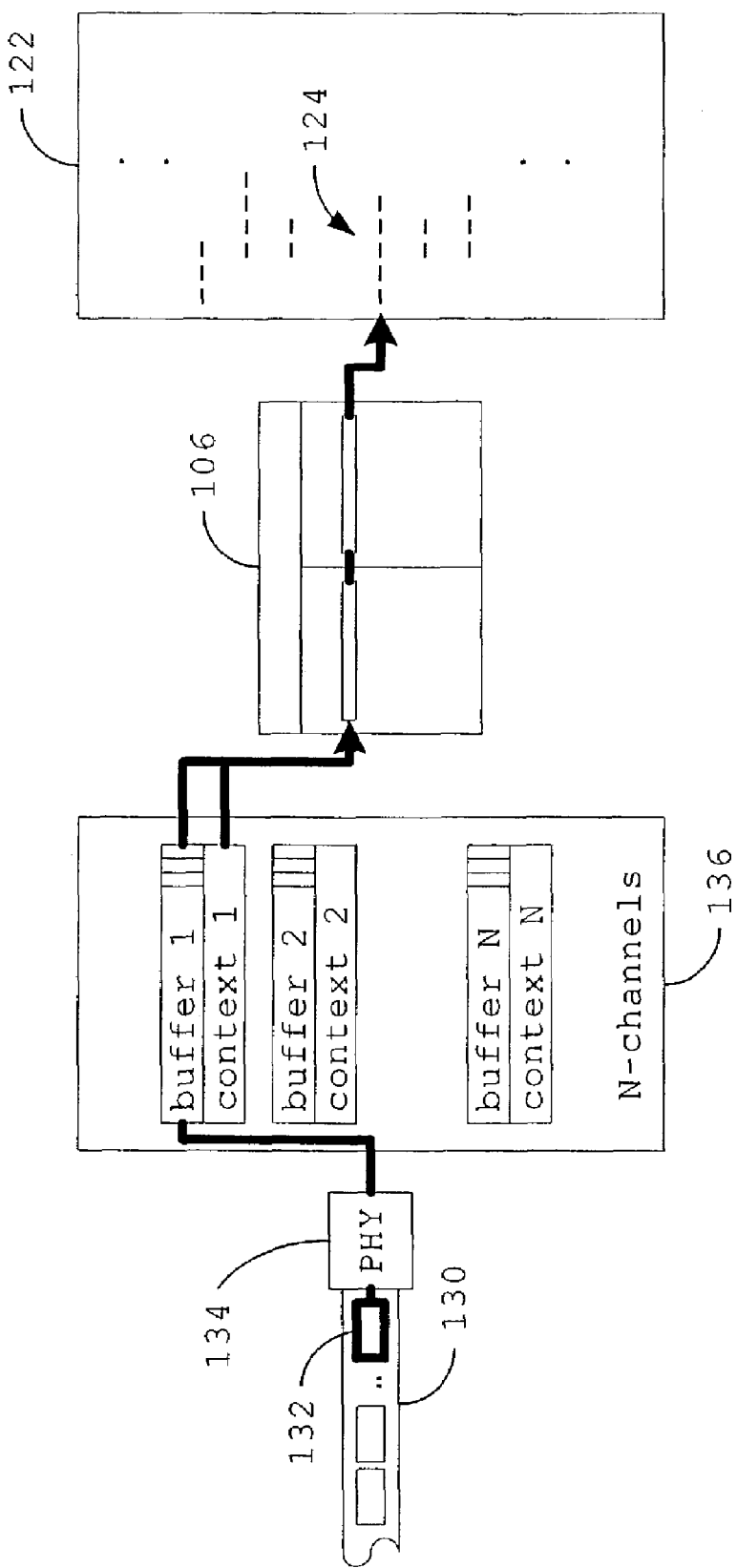

FIG. 2 illustrates operation of an implementation of techniques described above in a sample operating environment. As shown, a system features a physical layer (PHY) device 134 (e.g., an optic PHY) that receives signals over some medium 130. In the sample shown, the signal (e.g., a Tn carrier) uses Time Division Multiplexing (TDM) to carry different channels in different time-slices. Potentially, the different channels may carry different frames. Thus, as shown, the system accumulates frame bits from the different channels in different respective buffers 136. For example, bits 132 that arrive during a time-slot assigned to channel 1 are added to buffer 1. As shown, the system may also associate context data with a channel such as the current frame state (e.g., in-frame or out-frame), "1"-s count, partially assembled characters, and/or CRC residue.

Accumulated frame bits are "popped" from the buffers for frame processing. Based on these bits, the system determines (e.g., using table 106) the location of the appropriate bit-handling instructions 124 to execute. These instructions 124 can update the channel context (e.g., updating the "1"-s count), output bit sequences stripped of stuffed bits, output identification of identified flags, and so forth.

Again, the environment shown in FIG. 2 is merely illustrative. For example, the techniques may be used with other multiplexing and non-multiplexing carriers. Additionally, while FIGS. 1 and 2 depict frame receive paths, the techniques may also be applied to transmit paths. For example, instead of performing bit stripping, the instructions can perform bit stuffing. Similarly, instead of identifying stop, end, and abort flags, the instructions can insert the associated bit sequences into the stream of frame bits.

Figure 3A:
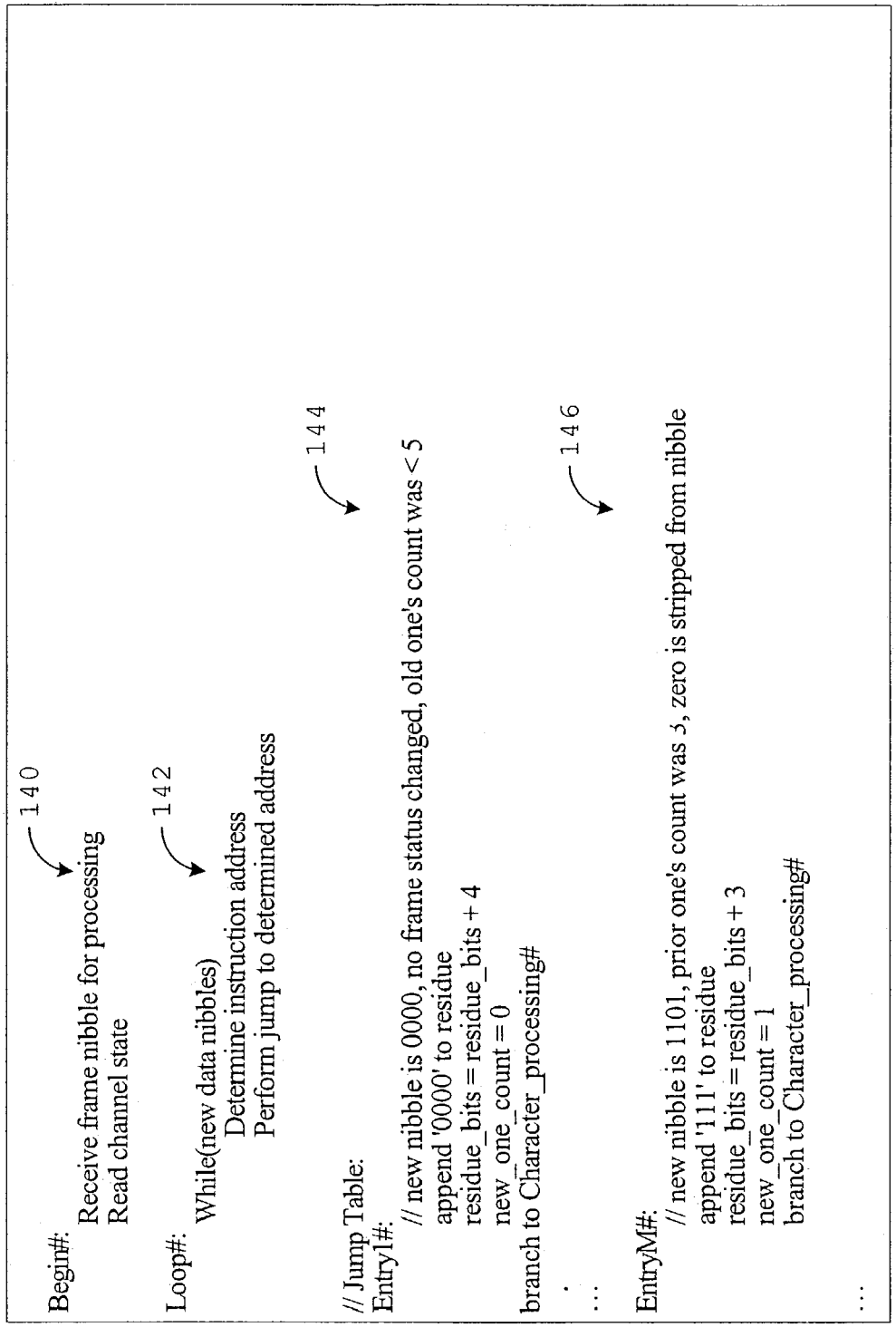

FIGS. 3A and 3B list sample pseudo-code instructions to process sets of frame bits. The instructions may be generated by compilation or assembly of code written in a variety of programming languages. (e.g., assembly language, C, or C++).

The code shown includes a loop 142 that repeatedly processes nibbles of a frame bit-stream by determining the address to jump to for a given nibble. The procedures 144, 146, 148 (labeled "Entry") can determine bits to add to a residue of frame bits not yet output or identified as a flag. The procedures 144, 146, 148 also track the number of bits in the residue. The residue data can form part of the channel context and persists between execution of the instructions for different nibbles.

As shown, the code includes common instruction sequences 150, 152 that the procedures can branch to, such as a "Character_Processing" sequence 150 that outputs eight processed bits. The code also includes sequences to handle identified flags. For example, an instruction sequence 152 to handle an "End" flag can complete CRC computation for the frame and retain bits of a new frame straddling the same nibble as the end-of-frame flag bits. The sequence 152 can also ensure that the frame featured an integral number of bytes. The code can include other instructions (not shown) such as code that distinguishes between a channel idling in flag and one idling in MARK. Similarly, code can discard frames shorter than some minimum size.

Figure 4:
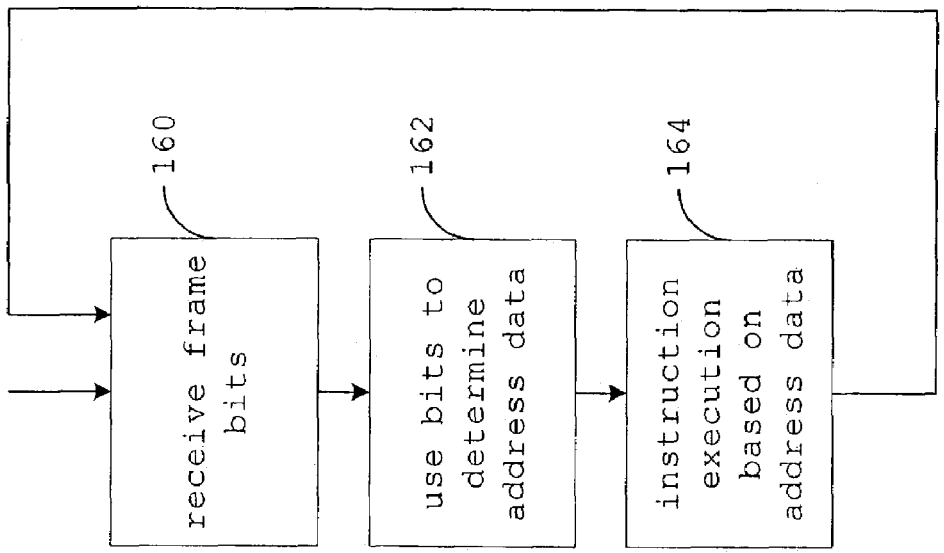
FIG. 4 is a flowchart of a process to determine an instruction address based, at least in part, on bits of frame.

FIG. 4 depicts a flowchart of a process to process frame bits using techniques described above. As shown, the process repeatedly uses received frame bits 160 to determine 162 the address of frame handling instructions to execute. Subsequent instruction execution 164 proceeds at the determined address.

The techniques described above may be used in a wide variety of systems. For example, the techniques may be implemented by the logic of a line card, framer, or Medium Access Controller (MAC) component. For instance, a system (e.g., a router or bridge) may include a collection of line cards that feature one or more ingress and/or egress PHYs and at least one processor to execute instructions described above. Such line cards may be interconnected by a switch fabric (e.g., a crossbar or point-to-point fabric).

Figure 5:
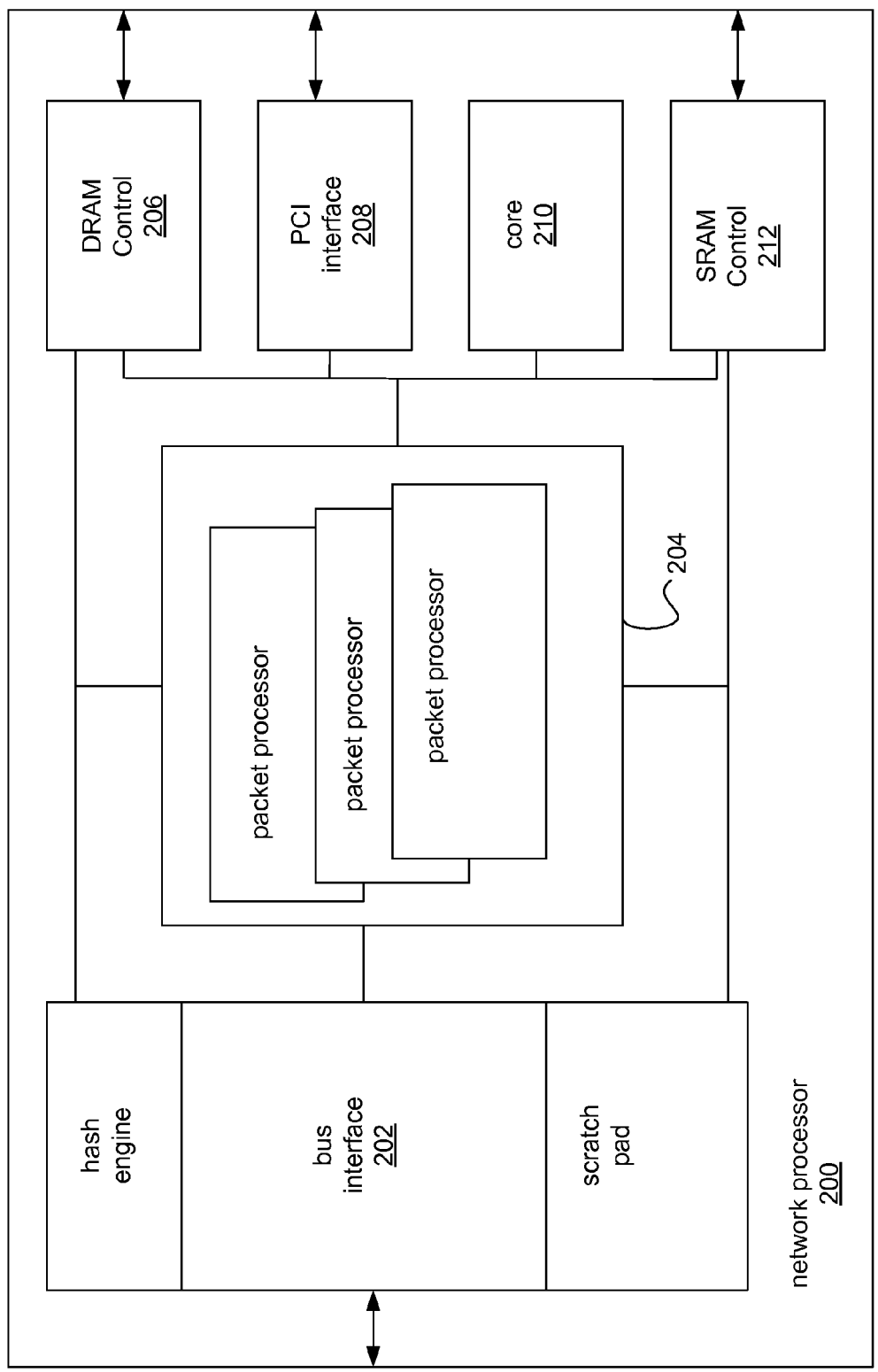
FIG. 5 is a diagram of a network processor programmed to execute frame operation instructions.

As shown in FIG. 5, the techniques may be implemented using a programmable network processor 200 that features multiple packet processors 204. The network processor 200 shown is an Intel® Internet eXchange network Processor (IXP). Other network processors feature different designs.

As shown, the network processor 200 features an interface 202 (e.g., an Internet eXchange bus interface) that can carry frame bits between the processor 200 and other network components. For example, the bus may carry frame bits received via physical layer (PHY) components (e.g., wireless, optic, or copper PHYs). The processor 200 also includes an interface 208 for communicating, for example, with a host. Such an interface may be a Peripheral Component Interconnect (PCI) type interface. The processor 200 also includes other components such as memory controllers 206, 212, a hash engine, and scratch pad memory.

The collection of packet processors 204 may be Reduced Instruction Set Computing (RISC) processors tailored for packet processing operations. For example, the packet processors may not include floating point instructions or instructions for integer multiplication or division commonly provided by general purpose processors.

An individual packet processor 204 may offer multiple threads. The multi-threading capability of the packet processors 204 may be supported by hardware that can quickly swap between the different threads.

The processor 200 also includes a core processor 210 (e.g., a StrongARM® XScale®) that is often programmed to perform "control plane" tasks involved in network operations. The core processor 210, however, may also handle "data plane" tasks and may provide additional packet processing threads.

The network processor 200 may implement techniques described above in a variety of ways. For example, in implementations that use a lookup table, the table data may be stored in packet processor memory. Further, different implementations may be tailored to the instruction set provided by the packet processors. For example, instructions for IXP packet processors may feature a "jump[src, label#]" instruction that quickly computes an absolute address from an offset and base address. The IXP packet processors 204 also provide an instruction that accesses CRC hardware that can process up to 4-bytes of data in a single instruction.

The threads of the packet processors 204 may be allocated in a variety of ways. For example, one or more threads may handle ingress and egress TDM operations. Other threads can implement the frame processing techniques described above. The different threads may communicate, for example, using circular buffers.

While the discussion above used HDLC frame processing in several examples, techniques described above can be applied to a wide variety of protocols such as Point-to-Point Protocol (PPP), Synchronous Data Link Control (SDLC), Serial Line IP (SLIP), among other link layer/Asynchronous Transfer Mode (ATM) transmission convergence sub-layer protocols. Additionally, while techniques described above may be used in protocols featuring "bit-stuffing", the techniques may also be applied to protocols featuring "character stuffing" or other data stream operations. Further, the techniques may be applied to protocols at other levels in a protocol stack.

The techniques may be implemented in hardware, software, or a combination of the two. The programs may be disposed on computer readable mediums and include instructions for causing processor(s) to use the techniques described above.

Other embodiments are within the scope of the following claims.

What is claimed is:

1. A method of processing bits of a frame, the method comprising:
   accessing a subset of bits of a frame;
   based, at least in part, on the subset of bits, determining an address of an instruction within a set of instructions that perform at least one frame operation on the bits; and
   executing instructions at the determined instruction address, wherein the determining comprises performing a table lookup keyed, at least in part, by the bits, the table associating different keys with the same instruction address data.

2. The method of claim 1, wherein the instruction address data comprises an address offset from a base address.

3. The method of claim 1, wherein the table lookup comprises a table lookup keyed by a combination of the subset of bits and context data derived from at least one previous subset of frame bits.

4. The method of claim 1, wherein the determining comprises performing a logical operation on, at least, the subset of bits.

5. The method of claim 1, wherein the subset of bits comprises bits of at least one of the following frames: a High Data Link Control (HDLC) frame and a Point-to-Point Protocol (PPP) frame.

6. The method of claim 1, wherein the at least one frame operation comprises at least one of the following: bit stuffing, bit stripping, identification of a frame start flag sequence, identification of a frame end flag sequence, and identification of an abort flag sequence.

7. The method of claim 1, further comprising accumulating bits of a frame from a channel of a Time Division Multiplexing (TDM) signal.

8. The method of claim 1, wherein the executing instructions comprises executing the instructions by a packet processor of a network processor.

9. The method of claim 1,
   wherein the frame bits comprise bits of a High-Level Data Link Control (HDLC) frame accumulated from a channel of a Time Division Multiplexing (TDM) signal; and
   wherein determining an instruction address comprises a table lookup keyed by the subset of bits and a count of 1-s immediately preceding the subset of bits from at least one previous subset of bits, the table associating different keys with the same instruction address data.

10. The method of claim 9, wherein the executing instructions at the determined instruction address comprises an execution jump to the determined address by a Reduced Instruction Set Computing (RISC) packet processor of a network processor having multiple RISC packet processors.

11. A system, comprising:
    at least one processor, wherein the processor to:
    access a subset of bits of a frame;
    based, at least in part, on the subset of bits, determine an address of an instruction within a set of instructions that perform at least one frame operation on the bits; and
    cause instructions to be executed at the determined instruction address, wherein the instructions to be executed comprise instructions to cause a table lookup keyed, at least in part, by the bits, wherein the table associates different keys with the same instruction address data.

12. The system of claim 11, wherein the table lookup comprises a table lookup keyed by a combination of the subset of bits and context data derived from at least one previous set of bits.

13. The system of claim 11, wherein the instructions to be executed comprise instructions to perform a logical operation on, at least, the subset of bits.

14. The system of claim 11, wherein the subset of bits comprises bits of at least one of the following frames: a High-Level Data Link Control (HDLC) frame and a Point-to-Point Protocol (PPP) frame.

15. The system of claim 11, wherein the at least one frame operation comprises at least one of the following: bit stuffing, bit stripping, identification of a frame start flag sequence, identification of a frame end flag sequence, and identification of an abort flag sequence.

16. The system of claim 11, further comprising instructions to accumulate frame bits from a channel of a Time Division Multiplexing (TDM) signal.

17. The system of claim 11, wherein the at least one processor comprises at least one packet processor of a network processor.

18. The system of claim 11,
    wherein the instructions to determine an instruction address comprise instructions to cause a table lookup keyed by the subset of bits and a count of 1-s immediately preceding the subset of bits from at least one previous subset of bits, the table associating different keys with the same instruction address data.

19. The system of claim 11, further comprising at least one physical layer (PHY) device, the at least one processor operating on frame bits received via the at least one PHY.

20. A computer program product comprising a computer readable medium storing instructions that, when executed, cause a processor to:
    access a subset of bits of a frame;
    based, at least in part, on the subset of bits, determine an address of an instruction within a set of instructions that perform at least one frame operation on the bits; and
    cause execution of instructions at the determined instruction address, wherein the instructions to determine comprise instructions that cause a table lookup keyed, at least in part, by the bits, the table associating different keys with the same instruction address data.

21. The computer program product of claim 20, wherein the instructions to cause a table lookup comprise instructions to cause a table lookup keyed by a combination of the subset of bits and context data derived from at least one previous set of bits.

22. The computer program product of claim 20, wherein the at least one frame operation comprises at least one of the following: bit stuffing, bit stripping, identification of a frame start flag sequence, identification of a frame end flag sequence, and identification of an abort flag sequence.

23. The program of claim 20, wherein the frame operation comprises a High-Level Data Link Control (HDLC) frame operation.

24. A system, comprising:

a crossbar switch fabric;

multiple line cards interconnected by the switch fabric, the line cards comprising:

at least one optic physical layer (PHY) device; and at least one processor, wherein the processor to:

access a subset of bits of a frame received via a time division multiplexed channel received by the at least one optic PHY;

based, at least in part, on the subset of bits, determine an address of an instruction within a set of instructions that perform at least one High-Level Data Link (HDLC) frame operation on the bits; and cause instructions to be executed at the determined instruction address, wherein the determine comprises performing a table lookup keyed, at least in part, by the bits, the table associating different keys with the same instruction address data.

25. The system of claim 24, wherein the at least one processor comprises at least one processor of a network processor's multiple Reduced Instruction Set Computing (RISC) packet processors.

* * * * *